United States Patent [19]

van de Leemput et al.

[11] 4,435,551

[45] Mar. 6, 1984

[54] PROCESS FOR THE POLYMERIZATION OR COPOLYMERIZATION OF ETHYLENE WITH AN IMPROVED SUPPORTED CHROMIUM OXIDE TYPE CATALYST

[75] Inventors: Lambertus J. M. A. van de Leemput, Echt; Godefridus A. H. Nooijen, Helden-Panningen; Hendrikus W. van der Loo, Munstergeleen, all of Netherlands

[73] Assignee: Stamicarbon B.V., Geleen, Netherlands

[21] Appl. No.: 418,020

[22] Filed: Sep. 14, 1982

Related U.S. Application Data

[62] Division of Ser. No. 261,738, May 7, 1981, Pat. No. 4,382,020.

[30] Foreign Application Priority Data

May 7, 1980 [NL] Netherlands ............... 8002599

[51] Int. Cl.$^3$ ................................ C08F 4/78
[52] U.S. Cl. ................................ 526/101; 502/154; 526/352
[58] Field of Search ................................ 526/101

[56] References Cited

U.S. PATENT DOCUMENTS 3,033,844  5/1962  Peters et al. ............ 252/430
3,635,840  1/1972  Hinton ............ 252/430
4,146,695  3/1979  van de Leemput ............ 526/105

Primary Examiner—Stanford M. Levin
Attorney, Agent, or Firm—Cushman, Darby & Cushman

[57] ABSTRACT

An improved process for the preparation of a catalyst for the polymerization of ethylene, and an improved process for preparing an ethylene polymer therewith. An improved supported chromium-containing catalyst is prepared by reacting (1) a chromium chelate of a 1,3-diketo compound and (2) a vanadium chelate or a vanadyl chelate of a 1,3-diketo compound, separately or jointly with (3) an organometallic compound of an element from Group II or III of the periodic system, jointly contacting the resulting reaction products of (1) and (2) with (3) with an inert inorganic supporting material so as to deposit such reaction products thereon, whereafter the supporting material containing the reaction products is heated in a non-reducing atmosphere at a temperature of between 200° and 1200° C. The 1,3-diketo compounds of (1) and (2) are the same or different, and have the formula

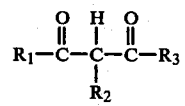

wherein $R_1$, $R_2$ and $R_3$ are the same or different, $R_1$ and $R_3$ being an alkyl group of 1–10 carbon atoms, and $R_2$ being selected from the group consisting of an alkyl group with 1–10 carbon atoms, and a hydrogen atom. The catalyst so prepared can be used either alone, or together with an organo-metallic compound of an element of Group II or III of the periodic system, in the polymerization of polyethylene or in the copolymerization of polyethylene with up to 15 mole percent of one or more α-alkenes having 3 to 15 carbon atoms.

3 Claims, No Drawings

PROCESS FOR THE POLYMERIZATION OR COPOLYMERIZATION OF ETHYLENE WITH AN IMPROVED SUPPORTED CHROMIUM OXIDE TYPE CATALYST

This is a division of application Ser. No. 261,738 filed May 7, 1981, U.S. Pat. No. 4,382,020.

BACKGROUND OF THE INVENTION

The present invention relates to an improved process for the preparation of supported chromium oxide-type catalysts used for the polymerization of olefins, and to an improved process for the polymerization and/or copolymerization of ethylene.

The polymerization of olefins, particularly of ethylene, with supported chromium oxide-type catalysts, has been known for a long time. Such polymerization can be carried out as a "solution process", in which the polymer is obtained as a solution in the solvent used for the polymerization, such as is described in U.S. Pat. No. 2,825,721. The polymerization of ethylene using a supported chromium oxide-type of catalyst can also be carried out as a 'slurry process', in which the ethylene polymer is precipitated, and is obtained as a slurry. Such a method is described in U.S. Pat. Nos. 2,825,721 and 3,087,917. Solution polymerization processes are generally carried out at temperatures of at least 120° C., whereas slurry polymerization processes are carried out at temperatures of about 110° C. at the most.

The molecular weight of the resulting ethylene polymer increases as the polymerization temperature is decreased. Thus, with the relatively low temperature slurry polymerization processes, ethylene polymers having very low melt indices, i.e., very high molecular weights, are often obtained. There are many catalyst of the supported chromium oxide-type which are very suitable for use in higher temperature solution polymerization processes operating at temperatures of, for example, 140° C. or higher. However, in slurry polymerization processes, these catalysts yield only high molecular weight polymers.

It is known that the molecular weight of the polymer can be reduced by use of molecular weight controllers. The most common molecular weight controller is hydrogen. However, many supported chromium oxide-catalysts show very little sensitivity to hydrogen. Accordingly, to utilize these catalysts in slurry polymerization processes, large quantities of hydrogen must be added to the monomer in order to obtain the desired molecular weights. Consequently, the effectiveness of the catalyst is strongly reduced, lower yields are obtained and, moreover, large quantities of hydrogen must be recirculated with relatively small quantities of monomer. Such methods are thus economically very unattractive, and are often hardly feasible technically to carry out.

On the other hand, slurry polymerization processes have generally a better efficiency than solution processes. For this reason, there is a need for catalysts which are capable of making lower molecular weight ethylene polymers in slurry polymerization processes, which catalysts are more sensitive to variations in temperature and to molecular weight controllers such as hydrogen. Moreover, there is a wide variation in the correlation between changes in polymerization temperature and resulting polymer molecular weight from catalyst to catalyst. With many catalysts, the molecular weight shows very little variation with changes in the polymerization temperature. In some prior art catalysts, however, it is stronger, and with these catalysts molecular weight can be better influenced by the choice of the polymerization temperature. However, in this respect they are not fully satisfactory, and there remains a need for further improvement. In using these catalysts it is also very desirable that limited quantities of hydrogen can bring about a definite lowering of the molecular weight of the resulting polymer.

Various modifications of supported chromium oxide-types of catalysts have been proposed in order to influence and control molecular weights of ethylene polymers prepared therewith. Thus, it is described in U.K. Pat. No. 1,231,322, and in U.S. Pat. Nos. 3,812,058; 3,862,104; 3,900,457; and 3,974,101, that the melt index of resulting ethylene polymers is a function of the method used to prepare the silica support, and of the activation by heating of the supported chromium oxide. Thus, by making suitable choices among these preparative methods, polyethylene having higher melt indices can be prepared by means of a slurry polymerization process.

It is an object of the present invention to provide an improved process for preparing a supported chromium oxide-type of catalyst which can be effectively utilized in slurry polymerization processes, as well as in solution polymerization processes. It is a further objective of this invention to provide a chromium oxide-type catalyst having greater sensitivity to polymerization temperature and to molecular weight controllers such as hydrogen in affecting the molecular weight of the polymer produced, as compared to known catalysts. It is furthermore an objective of this invention to provide an improved process for the polymerization of ethylene, or the copolymerization of ethylene with one or more α-alkenes, utilizing the improved catalyst prepared in accordance with this invention.

SUMMARY OF THE INVENTION

It has now been found that a catalyst can be obtained which can be used for both solution polymerization and slurry polymerization processes for preparing polyethylene by reacting a chromium chelate of a 1,3-diketo compound, and a vanadium chelate or a vanadyl chelate of a 1,3-diketo compound, separately or jointly with organo-metallic compounds of an element from Group II or III of the Periodic System in which hydrocarbyl groups with 1-20 carbon atoms are bound, via carbon atom, to the relative element. The resulting reaction products are thereupon contacted with an inert inorganic supporting material in such manner as to deposit the reaction products thereon. The supporting material, with the reaction products deposited thereon, is then heated in a non-reducing atmosphere at a temperature of between about 200° and 1200° C. The 1,3-diketo compounds of the chromium chelate and the vanadium or vanadyl chelate are the same or different, and have the formula

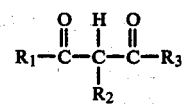

wherein $R_1$, $R_2$, and $R_3$ are the same or different, $R_1$ and $R_3$ being an alkyl group with 1–10 carbon atoms, and R₂ being either an alkyl group, having from 1–10 carbon atoms, or a hydrogen atom.

It is known in the prior art that a supported chromium oxide-type of catalyst for the polymerization of olefins can be prepared by bringing the conversion product of a chromium-1,3-diketo compound and an organo-metallic compound of an element from Group II or III of the Periodic System into contact with an inert inorganic supporting material whereafter it is heated in a non-reducing atmosphere at a temperature between 200° and 1200° C. Such a process is disclosed, in U.S. Pat. No. 4,146,695 wherein such a supported chromium oxide component is utilized together with an organo-metallic compound of an element from Group II or III of the Periodic System, for the polymerization of ethylene, and for the copolymerization of ethylene with up to 15 mole percent of one or more α-alkenes having 3 to 5 carbon atoms.

It is also known from U.S. Pat. No. 3,635,840 that catalysts for the polymerization of olefins can be prepared by contacting a previously formed supported chromium oxide with an organometallic compound and a vanadium chelate or a vanadyl chelate of a 1,3-diketone, whereupon the resulting product obtained is heated in an oxygen-containing gas at temperatures of from 500° to 1500° F. (260° to 816° C.). According to the example of said patent, vanadium acetylacetoneate in a cyclohexane solution was blended with triethylaluminum, and the resulting solution used to impregnate a previously prepared chromium oxide catalyst. The resulting chromium oxide catalyst so impregnated was thereupon heated for twenty-four hours at 1050° F. (566° C.). The catalyst so prepared was then utilized for the solution polymerization of ethylene in cyclohexane. Where the polymerization was carried out at a temperature of above 293° F. (145° C.), the polyethylene thus formed had a melt index of 0.17. By comparison, polyethylene prepared with this same catalyst at a reactor temperature of 299° F. (148.3° C.), had a melt index of 0.18.

It has now surprisingly been found that when carrying out the polymerization of ethylene using a catalyst of the present invention, ethylene can be polymerized at a temperature of only about 100° C. under conditions otherwise similar to the above noted example, to produce a polyethylene having a melt index of about 0.2. Moreover, the temperature sensitivity of the catalyst prepared in accordance with this invention proves to be considerably greater than with the known catalyst. Thus, with the catalyst according to U.S. Pat. No. 3,635,840, a difference in temperature of 3.3° C. will result in a change in melt index of the polyethylene prepared therewith of no more than 0.01. However, with the catalyst of the present invention, the polyethylene melt index can easily be varied to a considerable degree by only small variations in polymerization temperature, as is shown by the Examples, particularly by Examples 6, 7 and 8. Moreover the present catalysts give polyethylenes with suitable melt indexes in the slurry polymerization temperature range, as shown by the Examples 2–5. Moreover the catalysts of this invention also have good hydrogen sensitivity, so that the addition of only limited quantities of hydrogen will bring about a substantial reduction in the molecular weight of the polyethylene prepared.

Thus, when utilizing the catalyst prepared in accordance with this invention, it has been found that the slurry polymerization of ethylene can effectively and advantageously be carried out at polymerization temperatures of between about 80° C. and 105° C., producing polyethylene having melt indeces in the range from about 0 to 4. It is furthermore a particular advantage of these catalysts that they can be used in either solution or slurry types of polymerization processes.

The 1,3-diketo complexes of both chromium and of vanadium used in the invention are chelates of these metals with 1,3-diketo compounds having the general formula

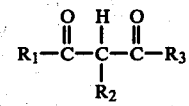

wherein $R_1$ and $R_3$ are the same or different, and each represent an alkyl group having 1–10 carbon atoms, and wherein $R_2$ may be either an alkyl group having 1–10 carbon atoms or a hydrogen atom.

Suitable 1,3-diketo compounds for use in this invention include acetylacetone; hexane-2,4-dione; heptane-2,4 dione; octane-2,4-dione; octane-3,5-dione and homologues thereof, wherein $R_2$ is an alkyl group with 1 to 10 carbon atoms. Preferably, however, a 1,3-diketone is used in which $R_2$ is a hydrogen atom, and acetylacetone is particularly preferred.

Preferably, the chromium-1,3-diketo complex is the chromium(III)-acetylacetonate. Acetylacetonates of vanadium are preferred as well, and may be V(acac)₂; V(acac)₃; VO(acac)₂ and VO(acac)₃, wherein "acac" represents the acetylacetone residue or radical. Similar compounds of other 1,3-diketones can also be used. However, good results are obtained with vanadium(III)acetylacetonate, and the use of this latter complex is preferred.

The 1,3-diketo compounds, preferably the acetylacetonates, are converted with an organometallic compound of an element from Group II or III of the periodic system, such as beryllium, magnesium, boron, aluminum or gallium. The organometallic compounds of transition elements from Groups II and III are preferably compounds of the type $(R_4)_m Me$, wherein $R_4$ represents a hydrocarbyl group, and "m" is either 2 or 3 depending upon the valency of the element "Me". The hydrocarbyl groups of these compounds are preferably alkyl groups with 1–20 carbon atoms.

Aluminumtrialkyls and magnesiumdialkyls have been found to be particularly suitable as the organometallic compound used in this invention. The alkyl groups in the magnesium dialkyl preferably contain 4 to 12 carbon atoms, and dibutylmagnesium and diisobutylmagnesium are particularly preferred. Suitable organomagnesium compounds for use in accordance with this invention also include diethylmagnesium, dipropylmagnesium, diisopropylmagnesium, diamylmagnesium, dihexylmagnesium, dioctylmagnesium, didecylmagnesium, and didodecylmagnesium. Dicycloalkylmagnesium with the same or different cycloalkyl groups having 3 to 12 carbon atoms, preferably 5 to 6 carbon atoms, is also suitable. Likewise, an alkyl and a cycloalkyl group can be bound to the magnesium. Although alkyl- or cycloalkylmagnesium compounds are preferred, magnesium aryls can also be used, if desired, particularly diphenylmagnesium, but ditolyl- and dixylyl magnesium can be used as well. The diarylmagnesium compounds are generally at most poorly soluble in aliphatic hydrocarbons and are, therefore, dissolved in aromatic hydrocarbons.

The organomagnesium compounds can be prepared in any known manner, for instance by the method as described in Organometallic Compounds, Vol. 1 by G. E. Coates, M. L. H. Green, and K. Wade; and in Organometallverbindungen by F. Runge. Particularly suitable solutions of magnesiumalkyls can be prepared in accordance with the method disclosed in the U.S. Pat. No. 3,737,393, that is herewith incorporated by reference.

The preferred aluminum compounds are aluminumtrialkyls. However, other organoaluminum compounds having the general formula of $(R_5)_2AlX$, wherein $R_5$ represents an alkyl group with 1-10 carbon atoms, and X a hydrogen atom or an alkoxy group, can also be used. It is desirable, however, to minimize the occurrence of alkoxy groups. Furthermore, aluminum compounds as disclosed, for instance, in German "Auslegeschriften" Nos. 1,956,353; 1,183,084; 1,136,113, and 1,186,633, containing one or more groups derived from a diene, can also be used. Of course, mixtures of these various organometallic compounds can be used.

The conversion of the diketo compounds in accordance with the invention with an organometallic compound of an element from Group II or III is carried out in a solvent which is inert with respect to these compounds. Preferably, this conversion is carried out in a hydrocarbon solvent, most preferably in one or more linear or branched aliphatic hydrocarbons, such as butane, pentane, hexane, heptane, octane, decane, or branched isomers thereof, or in a light petrol consisting mainly of hexanes and/or heptanes, or in a heavier petrol. Higher linear or branched saturated aliphatic hydrocarbons or mixtures thereof, can also be used as the solvent.

Chromium(III)acetylacetonate is more soluble in aromatic hydrocarbons than in aliphatic hydrocarbons, and it can be converted with magnesiumdiaryls soluble in aromatic hydrocarbons. However, because of the cost of aromatic hydrocarbon solvents, and also due to the possible health risks associated with aromatic hydrocarbons solvents, they are generally not used if suitable aliphatic and/or cycloaliphatic solvents can be used instead.

Because of their poor solubility in aliphatic and/or cycloaliphatic hydrocarbons, only minor amounts of chromium(III)acetylacetonate and the vanadium acetylacetonates are dissolved, the rest remaining in suspension in the solvent. However, when an organomagnesium or organoaluminum compound is added, the acetylacetonates will go at least for the major part into solution. This dissolution can be promoted by lightly heating the solution, for instance, at temperatures of from about 40° to 100° C. or, where low-boiling solvents are used, to the boiling point of the solvent. The heating may optimally be conducted under pressure.

The acetylacetonates will color the hydrocarbon solvent lightly because a small part dissolves therein. However, when the organomagnesium or organoaluminum compound is added, dark colored solutions will be formed. Thus, the dark violet chromium(III)acetylacetonate will dissolve in light petrol only to a small degree, resulting in a faintly violet-colored solution. However, when a magnesium or aluminumalkyl is present, considerable quantities of chromium(III)acetylacetonate will go into solution, and a deep dark brown solution will be formed. Similarly, vanadium(III)acetylacetonate will dissolve only to a small degree to form a faintly brown solution, but subsequent to conversion with a magnesium or aluminumalkyl, a dark brown solution will be formed.

The atomic ratio of the element from Group II or III in the organometallic compound, to the chromium plus vanadium in the 1,3-diketo complexes, is chosen to be in the range of from about 0.5:1 to 20:1, preferably in the range of from 1:1 to 6:1.

The inert inorganic support is preferably oxide, such as silica, alumina, mixed zirconia, thoria or magnesia. However, preferably silica, alumina, and mixed silica-alumina, and more preferably silica are used. Silica is well known, and may be applicable to the present invention in many of its different forms. However, silica xerogels, with large pore volumes, are particularly suitable.

Insofar as necessary, the support is dried, for instance, by heating in dry air, before the complex transition metal compounds are deposited thereon. The supporting material should be dried, preferably in a manner and to the extent that the support no longer contains physically bound water.

The solution of the complexes of the organometallic compound and the chromium and vanadium-1,3-diketo compound is contacted with the inert inorganic supporting material, for instance, by adding the solution slowly, with stirring, to a suspension of the supporting material in the same solvent. To the extent the chromium and vanadium compounds are not wholly or partly deposited from the solution onto the support, this deposition can be promoted by evaporation of the solvent. The deposition of these compounds from the solution onto the carrier will be clearly perceptible, in that the solution will become lighter in color, and the support will become more darkly colored.

The quantity of the complex chromium compound which is deposited on the support in accordance with this invention may be varied within wide limits, but generally should be in the range of between about 0.01 to 10% by weight calculated as chromium on the support. It is possible to apply a larger or lesser quantity of the chromium compound, but this offers no advantages. Preferably, the amount of the complex chromium compound deposited on the support will be such that the chromium content thereof will be in the range of between 0.02 to 2% by weight, more preferably in the range of 0.05 to 1% by weight.

The quantities of the complex vanadium compounds deposited on the supporting material in accordance with this invention, together with the complex chromium compound, may also vary within wide limits. Generally, this quantity will be chosen such that the atomic ratio of chromium to vanadium on the supporting material will be in the range of between about 50:1 and 1:50. Preferably, the amount of complex vanadium compound deposited on the support is chosen so that the chromium:vanadium ratio is in the range of between 20:1 and 1:20, more preferably in the range of between 10:1 and 1:10. By varying the atomic ratio of chromium to vanadium on the supporting material, the breadth of the molecular weight distribution in the resulting polymer can be influenced.

After contacting the complex chromium and vanadium compounds with the supporting material, the support and metal compounds are separated from the solvent by filtration or evaporation. To the extent the complex chromium and vanadium compounds are not deposited on the support to a considerable degree, as will be evident from the solvent showing little or no decolorization the solvent, will be expelled by evaporation The resulting support, with the chromium and vanadium compounds deposited thereon, is thereafter heated in a non-reducing atomsphere, such as oxygen, air, nitrogen, carbon dioxide or a noble gas at a temperature of between about 200° to 1200° C. Preferably, this heating is carried out in an oxidizing atmosphere such as, for instance, oxygen, oxygen-containing gases, or air. Air, having a reduced or raised oxygen content, also forms an oxidizing atmosphere which is suitable as well.

Preferably, the support having the metal compounds deposited thereon is heated at a temperature in the range from 400° to 1200° C., and more preferably is heated to a temperature within the range of from 500° to 1100° C. The heating times may vary from a few seconds to tens of hours or more. At temperatures of 500° to 1100° C., the heating time will generally be in the range of about 30 minutes to 8 hours. The optimum heating time can easily be determined experimentally by preparing, under otherwise similar conditions, catalysts having the same composition, and varying the heating time at the temperature at which heating is effected, and by subsequently determining and comparing the polymerization characteristics of the final catalysts obtained.

Subsequent to the heating step, the supported catalyst (after being cooled to the ambient temperature) is preferably brought into a hydrocarbon solvent, which preferably is the diluent or medium to be used in the polymerization. This hydrocarbon solvent may be comprised of aliphatic or cyclic hydrocarbons, such as butane, isobutane, normal or branched pentanes, hexanes, heptanes, octanes, and higher straight and/or branched saturated aliphatic hydrocarbons, cyclopentane, cyclohexane, cycloheptane, cyclooctane, and the like, or mixtures thereof. Particularly suitable are fractions obtained directly or indirectly from mineral oil, such as light petrol, kerosine, or gasoil, which may contain aromatics, but predominantly consist of aliphatic and/or cycloaliphatics. Aromatic hydrocarbons, such as benzene, toluene, xylenes, or halogenated hydrocarbons can also be used, but for practical reasons noted above, specifically the high cost and health risks associated therewith, preference will generally be given to aliphatic hydrocarbons or mineral oil fractions containing little or no aromatics.

The invention also includes an improved process for the polymerization or copolymerization of ethylene using the catalyst described above.

For carrying out the polymerization, the supported catalyst thus prepared is dispersed in an inert diluent, to which an organometallic compound of an element of Group II or III of the periodic system may also be added. Suitable organometallic compounds include those of beryllium, magnesium, boron, aluminum, or gallium. The molar ratio between the organometallic compound added at this point, and the chromium and vanadium components deposited on the support, may vary within wide limits, for instance, from 0.1:1 to 200:1. Preferably, however, such ratio will be in the range of between 1:1 and 40:1.

The polymerization conditions and the desired characteristics of the final polymer determine the extent to which the addition of such organometallic compounds is desirable. With low catalyst concentrations, and with relatively low monomer concentrations in the polymerization medium or diluent, the addition of such organometallic compounds can often assist in initiating and sustaining the polymerization. The impurities content of the monomer and in the diluent also affects the amount of such organometallic compound to be added. The desired amount of organometallic compound can easily be determined experimentally.

The addition of such organometallic compounds to the polymerization medium also slightly increases the activity of the catalyst, and may slightly reduce the melt index of the polyethylene to be prepared. The resulting polyethylene obtained with catalysts to which such organometallic compounds have been added has a lower density, and often a broader molecular weight distribution, than polyethylene prepared with the same catalyst under the same condition and circumstances, but without addition of the organometallic component. Thus, when using the catalyst of the invention, the properties of the polyethylene can be modified by the addition of organometallic compounds to the polymerization medium.

Slurry polymerization processes utilizing the catalysts of the invention are generally carried out at temperatures of at most about 100° C. With some volatile solvents, such as, for instance, isobutane, the slurry polymerization can be carried out at even slightly higher temperatures, up to about 110° C. Preferably, however, the slurry polymerization is carried out at temperatures of at most about 105° C. The polymerization can be carried out at temperatures as low as about 50° C., but preference is given to selecting a temperature at least 70° C., and more preferably at least 85° C. or higher.

The polymerization of ethylene can also be carried out using the catalysts of the invention at temperatures of above 120° C., for instance at temperatures of from 150° to 200° C. In such instance, a solution is obtained of the ethylene polymer in the solvent. This solution can be worked up by methods known in the art. The polymerization can also be carried out as a so-called gas phase polymerization such as disclosed in, for example, U.K. Patent Specification No. 1,373,982.

The polymerization processes using the catalyst of this invention can be carried out at either atmospheric or elevated pressures. When using low-boiling diluents, such as butane, isobutane, or pentane, the pressure in the polymerization reactor will have to be above atmospheric pressure. The monomer pressure may be atmospheric, but preferably will be higher. By carrying out the polymerization under elevated monomer pressures, higher yields can be obtained. Therefore, generally elevated monomer pressures up to for instance 10 MPa will be applied. Even higher pressures, up to for instance 200 MPa or more are possible, but generally are not applied for practical reasons.

Preferably, the polymerization will be carried out at pressures between about 600 and 8000 kPa, and more preferably at pressures of between 1200 and 5000 kPa. The most desirable pressure will depend, in part, upon the polymerization temperaure and the volatility of the diluent. The optimum monomer pressure will be determined, in part, by balancing the higher polyethylene productivity obtained at higher pressures against the increased cost of equipment necessary to operate the polymerization process at higher pressures. The ultimate choice of the optimum monomer pressure is substantially entirely a matter of balancing economic factors.

The quantity of catalyst present in the diluent or polymerization medium is generally chosen so that the diluent contains about 0.001 to 10 mmoles of chromium, calculated as metal, per liter of diluent, and perferably between about 0.001 and 0.1 mmoles of chromium per liter.

In carrying out the polymerization using the catalyst, and in accordance with the process of this invention, various known modifications can be applied. For instance, molecular weight can be regulated not only by temperature, but also by the addition of hydrogen or other molecular weight modifiers used for this purpose. Furthermore, the polymerization can be carried out in two or more steps, in either a parallel arrangement or in a series arrangement, in which process different catalyst compounds, temperatures, residence times, pressures, hydrogen concentrations and the like can be applied if desired.

DETAILED DESCRIPTION OF PREFERRED EMBODIMENTS

Preferred embodiments for carrying out the processes of this invention will be further elucidated by the following examples. It should be understood, however, that these examples are illustrative of some of many possible embodiments, and the invention is not limited thereto.

EXAMPLE 1 a. Catalyst Preparation

While being maintained under an atmosphere of dry nitrogen, 2 g of chromium(III)-acetylacetonate (equivalent to 5.73 mg of chromium metal) is suspended in 80 ml of light petrol having a boiling range of 60°-80° C. A small portion of the chromium (III)-acetylacetonate goes into solution, as a result of which the solvent is colored faintly violet. Subsequently, 4.33 ml of a 3.97 molar solution of triisobutyl aluminum in light petrol (equivalent to 17.19 mg of aluminum metal) is added dropwise while stirring.

Similarly, 2 g of vanadium(III)acetylacetonate (equivalent to 5.74 mg of vanadium metal) is suspended in light petrol, and 17.19 mmoles of triisobutyl aluminium was added. Both suspensions are stirred until all chromium and vanadium, respectively, go into solution, whereupon both solutions are brought to 100 ml by the addition of further light petrol.

50 g of a silica xerogel with a pore volume of 1.6 $cm^3/g$ and a specific surface of 250 $m^2/g$ is suspended in 250 ml of light petrol. Subsequently, 85 ml of the chromium solution, and 17 ml of the vanadium solution are first mixed with one another, and then added, with stirring, dropwise to the suspension of silica xerogel. This resulting mixture is then boiled, under reflux cooling, for one hour whereupon the petrol is then evaporated. The resulting silica xerogel on which the aluminum trialkyl complexes of chromium(III)acetylacetonate and vanadium(III) acetylacetonate are deposited are then heated for 8 hours in a stream of dry air at 900° C.

The final silica xerogel supported catalyst contains 0.50% by weight of chromium and 0.10% by weight of vanadium, calculated as metal.

b. Ethylene Polymerization

An amount of 1500 ml of light petrol and 0.1 g of catalyst are introduced into a stirred autoclave. 0.2 mmole of trioctylaluminum is added, and the autoclave contents are heated at 85° C. (resulting in a petrol pressure of 175 kPa), and ethylene is injected until the pressure is 700 kPa. The polymerization is carried out for 90 minutes at 85° C.

A polyethylene product having a melt index (measured according to ASTM D-1238) of 0.01 is obtained. The activity of the catalyst is calculated to be 1400 g of polyethylene per mg of chromium+vanadium (calculated as metal) per 100 kPa of ethylene pressure per hour.

EXAMPLES 2-7

In carrying out the polymerization in each of Examples 2-7, 1.2 kg of isobutane is introduced into a 5 liter autoclave under an atmosphere of dry nitrogen, whereupon the nitrogen is vented. The autoclave is then brought up to the polymerization temperature and ethylene (and hydrogen in Examples 6, 7, and 8) is injected into the autoclave. Approximately 400 mg of the catalyst prepared in accordance with Example 1a is added to the autoclave via a catalyst metering system. In Examples 3-8, triethylboron is added as well. The polymerization is carried out for a period of 90 minutes during which polymerization the ethylene pressure is maintained constant.

The conditions, and the results obtained in these Examples 2-7, are summarized in the Table which follows. On this Table, the third and fourth columns show, respectively, the ethylene and hydrogen pressure in kPa. The fifth column indicates the quantity of triethylboron in mg of boron per kg of isobutane. The productivity of the particular polymerization is reported in the sixth column in terms of grams of polyethylene produced per gram of catalyst.

It can be seen from Examples 2, 3 and 4 that a definite increase in activity is obtained by the addition of 1 ppm of triethylboron, but that greater additions of triethylboron have no further affect. It can also be seen that the addition of triethylboron slightly decreases the melt index of the resulting polyethylene.

From Examples 3 and 5 it can be seen that raising the polymerization temperature from 97° C. to 101° C. increases the melt index from 0.10 to 0.21, other conditions remaining the same. From Examples 3 and 7, it can be seen that the addition of hydrogen, while carrying out the polymerization at 97° C., results in an increase in the melt index from 0.10 to 0.29. The effect of temperature on the melt index of the resulting polymer when carrying out the polymerization in the presence of hydrogen is shown by a comparison of Examples 6, 7, and 8. From these latter examples it can be seen that a moderate increase in reactor temperature substantially increases the melt index of the resulting polymer.

TABLE

| example | reactor temp. °C. | pressure $C_2=$ | pressure $H_2$ | TEB ppm B | productivity | melt index |
|---|---|---|---|---|---|---|
| 2 | 97 | 600 | 0 | 0 | 2334 | 0.11 |
| 3 | 97 | 600 | 0 | 1 | 3110 | 0.10 |
| 4 | 97 | 600 | 0 | 2 | 2920 | 0.08 |
| 5 | 101 | 600 | 0 | 1 | 2610 | 0.21 |
| 6 | 92 | 1000 | 800 | 1 | 2515 | 0.08 |
| 7 | 97 | 1000 | 800 | 1 | 2500 | 0.29 |
| 8 | 106 | 1000 | 800 | 1 | 2460 | 2.8 |

What is claimed is:

1. An improved process for the polymerization of ethylene, or the copolymerization of ethylene with at most 15 mole percent of one or more alkenes having 3 to 15 carbon atoms, in the prsence of a supported chromium oxide type of catalyst, said improvement comprising carrying out said polymerization in the presence of a catalyst prepared by the steps of:
reacting in the presence of a solvent which is inert with respect to compounds (1), (2), and (3) hereinafter referenced,
(1) a chromium chelate of a 1,3-diketo compound, and
(2) a vanadium chelate or a vanadyl chelate of a 1,3-diketo compound,
separately or jointly with
(3) an organo-metallic compound of an element from Group II or III of the periodic system in which hydrocarbyl groups with 1-20 carbon atoms are bound, via a carbon atom, to the element;
jointly contacting the resulting solution containing the reaction products of (1) and (2) with (3) with, and depositing such reaction products on, an inert inorganic supporting material; and
heating said supporting material having such reaction products deposited thereon in a non-reducing atmosphere at a temperature between about 200° and 1200° C.;
wherein said 1,3-diketo compounds of (1) and (2) are the same or different and have the formula

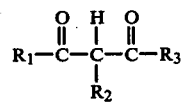

in which formula $R_1$, $R_2$, and $R_3$ are the same or different, $R_1$ and $R_3$ being an alkyl group with 1-10 carbon atoms, and $R_2$ being selected from the group consisting of an alkyl group with 1-10 carbon atoms, and a hydrogen atom.

2. The process of claim 1 wherein said polymerization is carried out in the additional presence of an organometallic compound of an element selected from Group II or III of the periodic system.

3. The process of claim 2 wherein the additional organometallic compound present during said polymerization is a trialkylaluminum.

* * * * *